July 23, 1935. W. L. NELSON ET AL 2,009,298
AUTOMATIC GRAB FISHHOOK
Filed Sept. 13, 1934
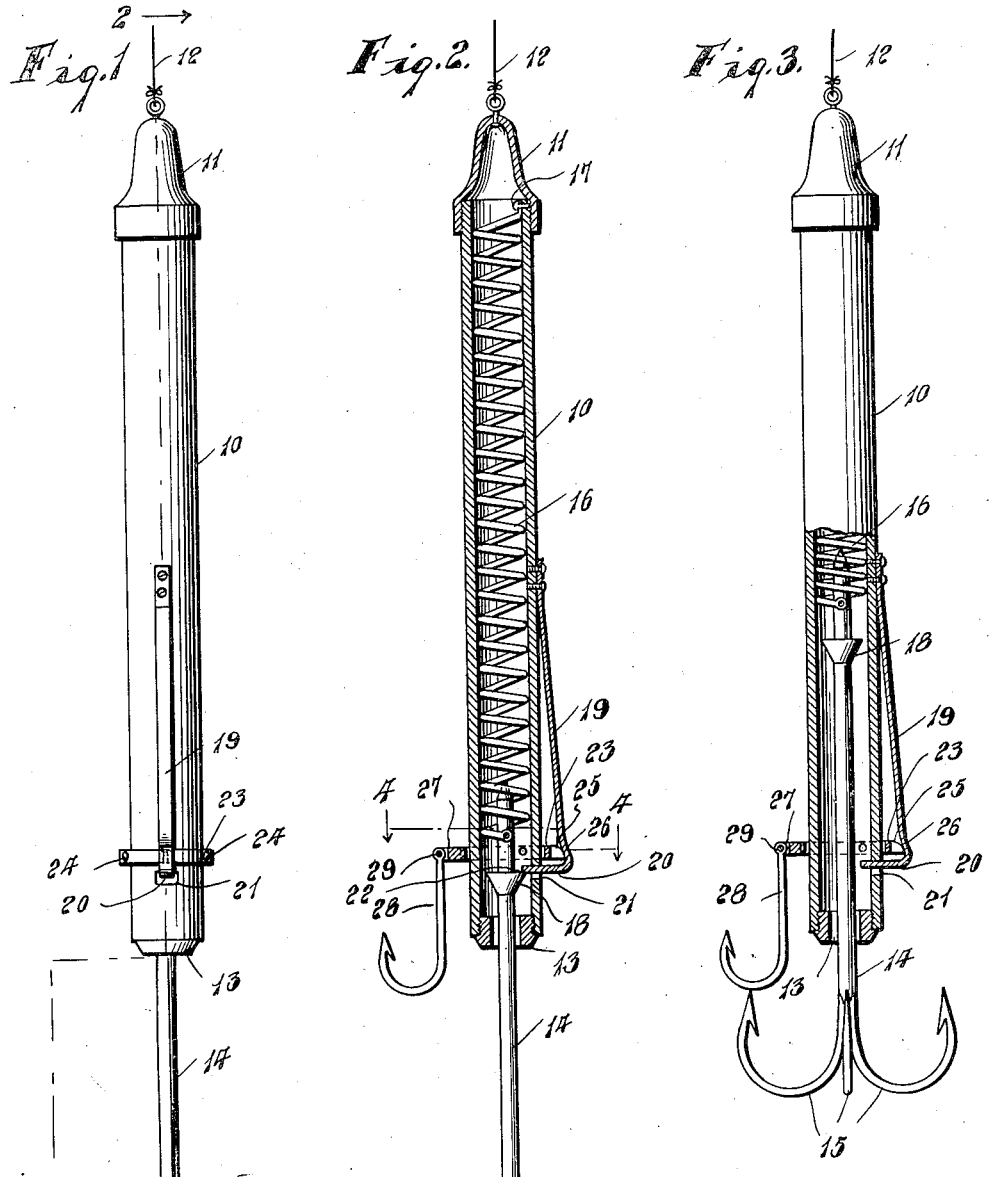
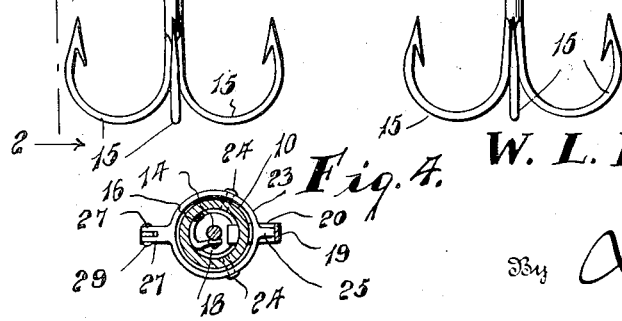

Patented July 23, 1935

2,009,298

UNITED STATES PATENT OFFICE 2,009,298

AUTOMATIC GRAB FISHHOOK

William L. Nelson and Bert J. Nelson, Waller, Tex.

Application September 13, 1934, Serial No. 743,908

3 Claims. (Cl. 43—34)

The invention relates to fish hooks and has for its principal object the provision of means for insuring the catch of fish by providing spring actuated grab hooks that are released to action by the fish taking the bait whether seized by the bait hook or otherwise, so as to prevent escape of the fish and insure the catch.

The invention will be described in detail hereinafter and will be found illustrated in the accompanying drawing, in which Figure 1 is a view in elevation of the improved automatic grab fish hook, Figure 2 is a sectional view on a plane indicated by the line 2—2 of Figure 1 showing the rod with the grab hook in set position, Figure 3 is a view similar to Figure 2, showing the device in a released position, and Figure 4 is a sectional detail on a plane indicated by the line 4—4 of Figure 2.

Referring to the drawing, in which similar reference characters are used to designate corresponding parts throughout the several views, the improved grab fish hook includes a tubular member 10 having secured at one end thereof a bell-shaped cap member 11 to which may be secured a fishing line 12. In the opposite end of the tube 10 is secured a guide ring 13 in which is slidably mounted a rod 14 having a plurality of hooks 15 on its free end. Secured to the rod 14 is a retractile coil spring 16, mounted in the tube 10, and having its free end secured to the tube 10 as shown at 17.

18 indicates a tapered or conical projection on the rod 14 within the tube 10. Secured to the front of the tube 10 is a latch member comprising a leaf spring 19 having its free extremity bent inwardly at substantially right angles to the remainder of the spring 19, as shown at 20, and that extends through an opening 21 in the tube, and is normally engageable with the projection 18 as shown at 22 to hold the rod 14 and the hooks 15 in projected arrangement relatively to the tube, and the spring 16 under tension.

Mounted on the tube 10 and of slightly larger diameter than the tube is a ring member 23, that is pivotally secured to the tubular member 10 as shown at 24. Said ring member 23 has a projection 25 that is arranged to engage the leaf spring 19, said spring member being offset inwardly toward the tube as shown at 26 to provide a cam action when the ring member 23 is moved to release the angular end 20 from engagement with the projection 18. Diametrically opposite to the projection 25 the ring member 23 is provided with ears 27 between which is pivotally secured a bait hook 28 as shown at 29.

In operation it will be apparent that the device when in the position shown in Figures 1 and 2, with bait secured on the hook 28, that the fish taking the bait, or endeavoring to steal it without being snagged by the hook 28 will operate the trigger member consisting of the ring 23 so as to provide a cam action between the projection 25 and the offset portion 26 of the spring latch 19, and by so doing the angular extremity 20 of said spring latch will be released from engagement with the projection 18 and release the rod 14 and the hooks 15 to action of the retractile coil spring 16 so that the fish will be snagged by one or more of the hooks 15, insuring catch of the fish whether or not it has swallowed the bait hook or endeavored to remove the bait from the hook 28, thus adding to the pleasure of fishing by insuring the catch, as well as the profit of a commercial fisherman. It will also be apparent that should the snagged fish endeavor to escape and exert a pull against the spring 16 in doing so, the projection 18 will engage the guide 13 and prevent removal of the rod 14 from the tubular member 10.

It will also be understood that the device may be made of any size and proportion for catching large or small fish as may be desired.

What is claimed is:—

1. An automatic grap fish hook, comprising a rigid member having a line secured at one end thereof, a rod slidably mounted relatively to its opposite end, a retractile coil spring terminally engaging the rod and rigid member, grab hooks on the free end of said rod, a spring latch mounted on the rigid member and tensioned to engage said rod to hold it against the action of said coil spring, a trigger member pivotally secured to the rigid member and having a projection engageable with the latch to release it from said rod, and a bait hook secured to said latch.

2. An automatic grab fish hook, comprising a tubular member having a line secured to one end thereof, a rod slidably mounted in the opposite end of the tubular member and having grab hooks secured to its free end, a tapered projection on the rod, a latch member secured to the tubular member and engageable with said projection, a retractile coil spring having one of its ends secured to the tubular member and its other end to the rod, and a trigger member pivotally secured to the tubular member and having a projection engaging the latch, and a bait hook secured to the trigger member.

3. An automatic grab fish hook, comprising a tubular member having a line secured to one end thereof, a rod slidably mounted in the opposite end of the tubular member, a retractile coil spring in said tubular member and having one of its ends secured thereto and its other end secured to said rod, grab hooks secured to the outer end of said rod, a tapered projection on said rod within the tubular member, a leaf spring secured to the tubular member and having an angular extremity engageable with said projection to hold the rod in extended position against the action of the coil spring, an annulus pivotally secured to the tubular member and having a projection engaging said leaf spring, and a bait hook secured to said annulus on the opposite side thereof from the projection thereon.

WILLIAM L. NELSON.
BERT J. NELSON.